(12) United States Patent
Gupta

(10) Patent No.: US 7,903,819 B2
(45) Date of Patent: Mar. 8, 2011

(54) MEMORY EFFICIENT STORAGE OF LARGE NUMBERS OF KEY VALUE PAIRS

(75) Inventor: Avinash Gupta, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 844 days.

(21) Appl. No.: 11/852,154

(22) Filed: Sep. 7, 2007

(65) Prior Publication Data

US 2009/0067631 A1    Mar. 12, 2009

(51) Int. Cl.
*H04L 9/00* (2006.01)
(52) U.S. Cl. .......................... 380/277; 711/170
(58) Field of Classification Search ............. 707/999.01, 707/999.001, 999.02
See application file for complete search history.

(56) References Cited

U.S. PATENT DOCUMENTS 7,096,213 B2    8/2006    Chatterjee et al.

*Primary Examiner* — Matthew B Smithers
(74) *Attorney, Agent, or Firm* — Weaver Austin Villeneuve & Sampson LLP

(57) ABSTRACT

In one embodiment of the present invention, storing a plurality of key value pairs may be accomplished by first, for each of two or more quantities of most significant bits, determining how much overall memory usage will be saved upon removal of the corresponding quantity of most significant bits from each key in the plurality of key value pairs. Then, for the quantity of most significant bits determined to have the most overall memory usage savings, the quantity of most significant bits may be removed from each key in the plurality of key value pairs. Then a first auxiliary data structure may be formed, wherein the first auxiliary data structure contains the removed quantity of most significant bits from each key in the plurality of key value pairs and pointers to the remaining bits of each key of the plurality of keys in a primary data structure.

20 Claims, 8 Drawing Sheets

| Keys | Values (not filled) |
|------|---------------------|
| 0001 | |
| 0010 | |
| 0100 | |
| 0101 | |
| 0110 | |
| 0111 | |
| 1000 | |
| 1001 | |
| 1010 | |
| 1011 | |

FIG. 5

MEMORY EFFICIENT STORAGE OF LARGE NUMBERS OF KEY VALUE PAIRS

BACKGROUND OF THE INVENTION

1. Field of the Invention

The present invention relates to computer storage. More particularly, the present invention relates to the memory-efficient storing of large number of key value pairs.

2. Description of the Related Art

A key value pair is a set of data items that contain a key, such as an account number or part number, and a value, such as the actual data item itself or a pointer to where that data item is stored on disk or some storage device. Key-value pairs are widely used in tables and configuration files. When loading large numbers of key value pairs into memory, however, memory space can quickly run out.

SUMMARY OF THE INVENTION

In one embodiment of the present invention, storing a plurality of key value pairs may be accomplished by first, for each of two or more quantities of most significant bits, determining how much overall memory usage will be saved upon removal of the corresponding quantity of most significant bits from each key in the plurality of key value pairs. Then, for the quantity of most significant bits determined to have the most overall memory usage savings, the quantity of most significant bits may be removed from each key in the plurality of key value pairs. Then a first auxiliary data structure may be formed, wherein the first auxiliary data structure contains the removed quantity of most significant bits from each key in the plurality of key value pairs and pointers to the remaining bits of each key of the plurality of keys in a primary data structure.

BRIEF DESCRIPTION OF THE DRAWINGS

FIG. 5 is a diagram illustrating an example of hash value pairs.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Storing large numbers of value pairs in memory can quickly use up all memory. Additionally, memory overhead utilized by standard data structures can be very high, since many generic data structures use pointers to keep track of keys and values. It was discovered that when the keys and values themselves are short (e.g., 4 bytes long each), using pointers to store them makes the data structure memory overhead more than the memory consumed by the data itself.

For example, if there are N key value pairs, then the data takes about 2N*4 bytes to store. In a hash table implementation, assuming a hash table of size H, the memory taken by the hash table is 4*H. Additionally, there is the overhead of the linked list for resolving collisions. This can be avoided by linear probing, however this solution incurs a performance hit depending upon the distribution of the data. The keys have to be stored so that they can be compared to find out the right value in the case of collisions and to find out if a value for the key exists at all. Therefore, total memory needed is at least 4(2N+H) bytes.

In a direct indexing implementation, if the range of key values is small, a table equal to the range of the keys could be allocated and the value could be stored at the index of the key. If R is the range of the keys, this would take 4R bytes. However, this solution fails miserably when the range of the keys is large, as is generally the case.

Figure 1:
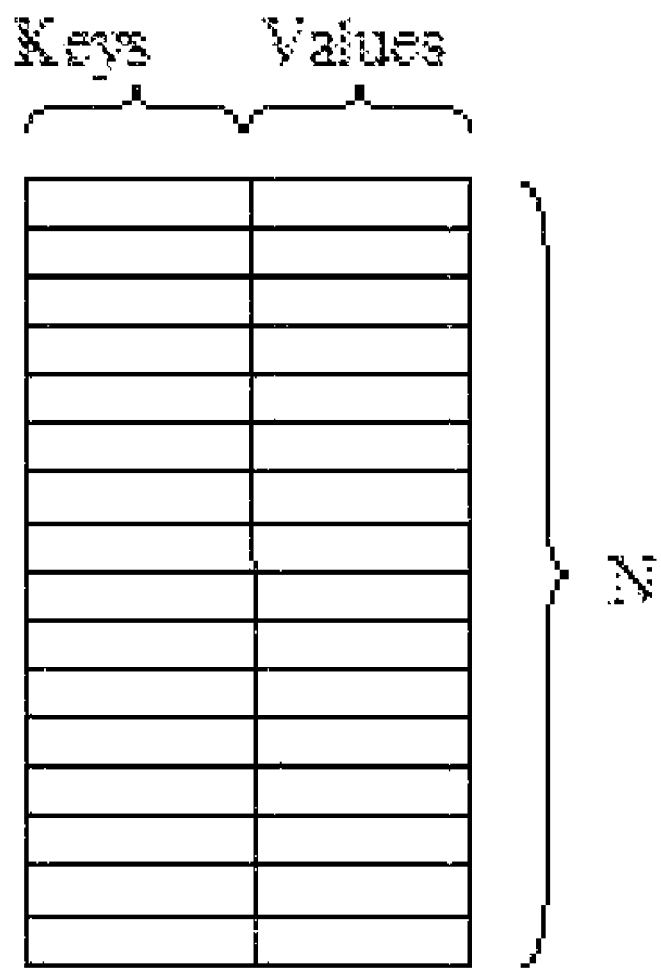
FIG. 1 is a diagram illustrating a standard key-value table.

A standard key-value table is depicted in FIG. 1.

In a sorted table approach, the data is stored in a table sorted by the keys,. To query for a key, a binary search can be used. Over large tables, however, this can be a performance drain. Indexes can be built over this table to speed up the performance. However, these indexes take extra memory. This approach takes at least 2N*4 bytes of memory.

In an embodiment of the present invention, a hybrid approach is utilized. Instead of storing the key in its entirety, some bits of the key may be taken out and used for indexing. For example, the p most significant bits may be taken out of the keys and stored in a separate table. The values in this auxiliary table at any given index have the value of the index in the sorted table from where the keys beginning with the auxiliary index begin. The end of this range would be given by the value of the next valid index in the auxiliary table (or the total number of entries). Then, its a matter of binary searching between this range matching the remaining bits of the comparison key to the keys in the sorted table.

Figure 2:
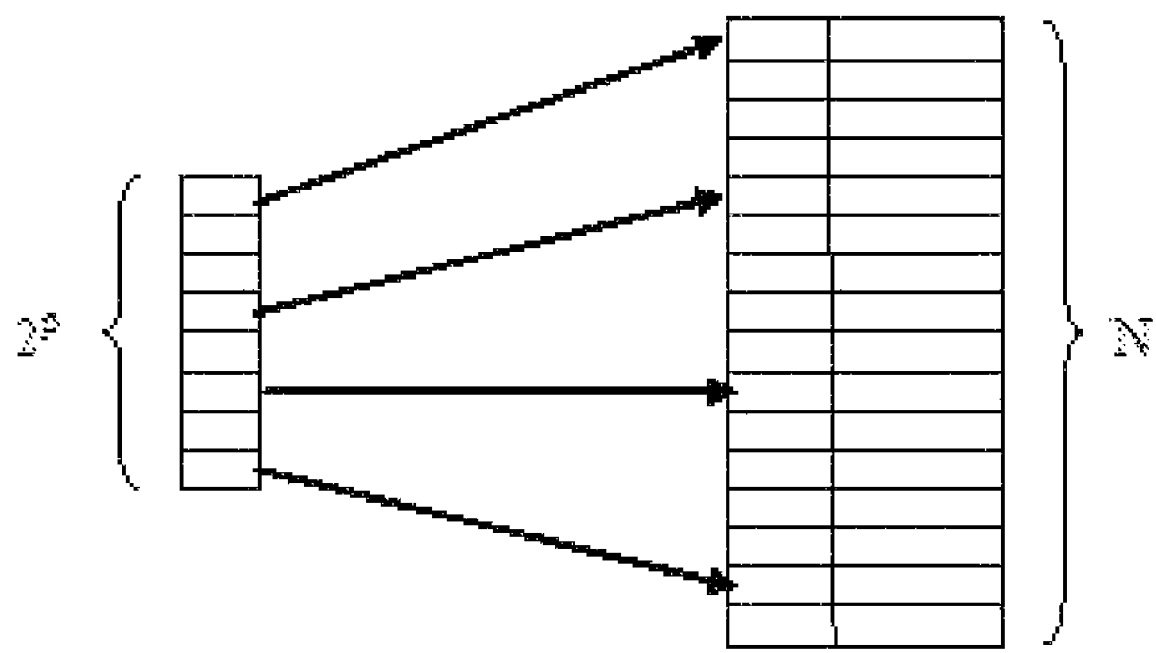
FIG. 2 is a diagram illustrating an example of an execution of an embodiment of the present invention.

An example of this method is depicted in FIG. 2. Here, the memory consumed by the auxiliary table 200 is $2^p*4$ (since each entry is 4 bytes), the memory consumed by the main sorted table 202 is (32−p)*N/8, the memory consumed by the values in the main sorted table is N*4, and the memory consumed by the keys of the main sorted table is $2^P*4+(32-p)*N/8$.

Figure 3:
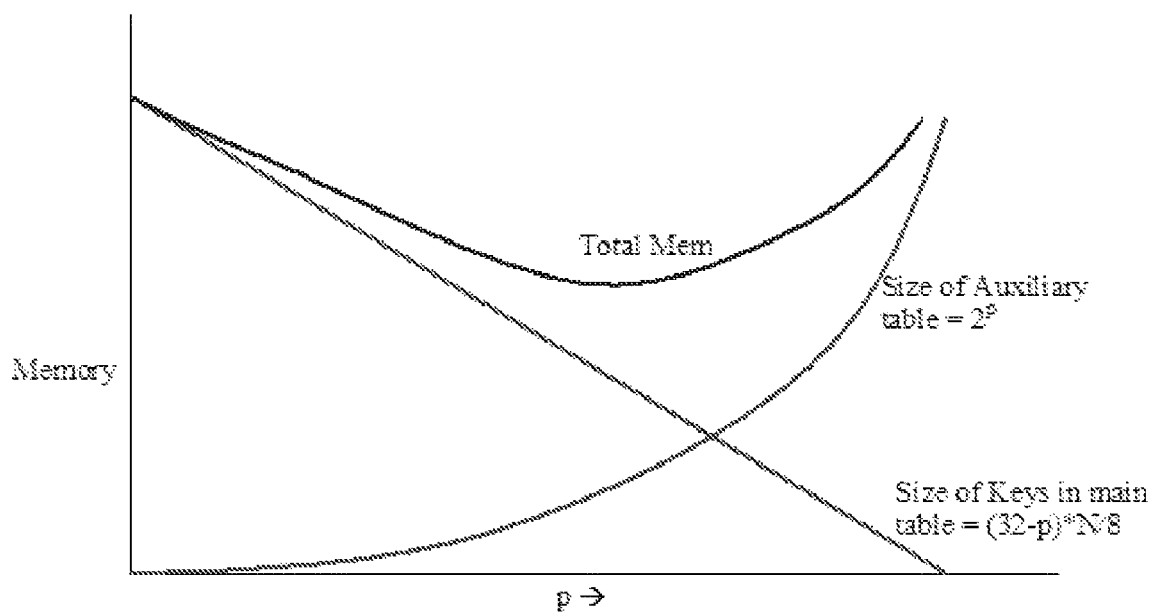
FIG. 3 is a graph depicting the relationship between memory consumed by an auxiliary table and the number of most significant bits taken from keys in a primary table.

The memory consumed by the auxiliary table increases exponentially with an increasing p. The memory consumed by the keys in the main sorted table decreases linearly with an increasing p. This relationship is depicted in the graph of FIG. 3.

Taking the derivative and solving it for p gives the optimal number of bits that can be taken away from keys in the main sorted table. Taking the second derivative gives an expression which always remains positive, which means this is a minima. The optimal value for p may be obtained at $p=\log_2 (N*\log_2 e/32)$.

Taking the more general case, if
N=total number of entries
K=size of the key in bits
V=size of the value in bits
M=machine size in bits (32 bit/64 bit, basically size of a pointer)

Then, assuming pointers are used for indexing in the main sorted table, the optimal value of p is:

$$p=\log_2(N*\log_2 e/M)$$

Assuming indexes are used for indexing in the main sorted table, the optimal value of p is $$p=\log_2(N*\log_2 e/(\log_2 N+1))$$

It makes sense to take away bits only if the total amount of bits saved are more than the bits needed for creating indexes.

$$2^P*M<p*N$$

Solving for the optimal value of p, $p>\log_2 e$, which means that $p>=2$ (since p can only be a positive integer).

Furthermore:

Total Memory saved (in bytes)=$N*\log_2(N/(\log_2 N+1))/8$

Percentage Memory saved=$100*\log_2(N/(\log_2 N+1))/(K+V)$

Figure 4:
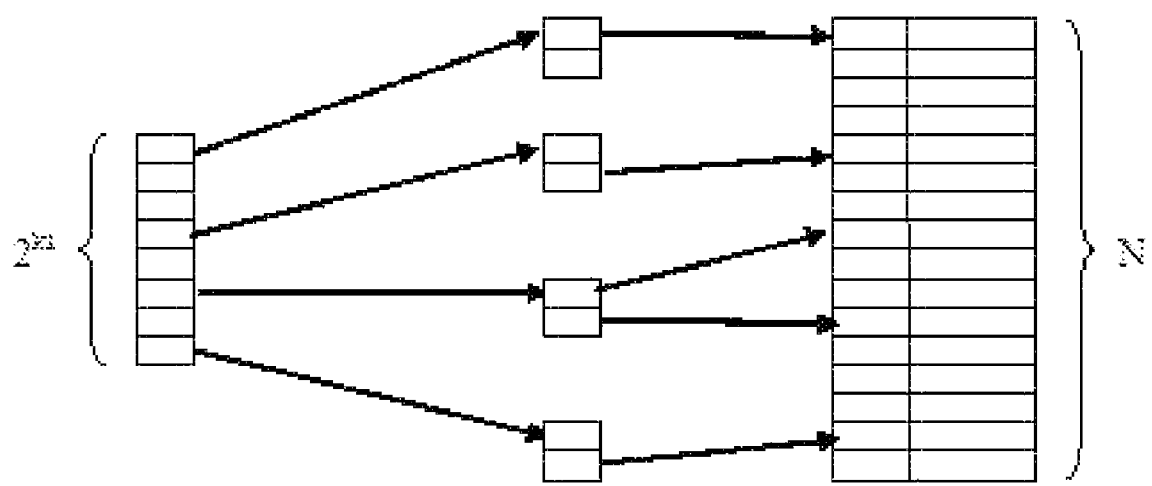
FIG. 4 is a diagram illustrating an example of two-level indexing in accordance with an embodiment of the present invention.

It should be noted that this scheme does not take the distribution of data into account. The number of bits selected for indexing is agnostic of the distribution. However, it is possible to reduce the memory requirement further by analyzing the data distribution, and an embodiment of the invention is envisioned as doing precisely that. One way of accomplishing that would be to create multiple levels of indexing (e.g., a two level indexing mechanism as depicted in FIG. 4).

A key observation, in this regard, is that many entries in the primary index table could be blank, because there are no keys that start with those bit sequence. So, for those entries in the primary index table, there is no need for secondary indexes and hence the memory for those secondary indexes can be saved.

Besides the parameters defined above, assume $k_1$ is the number of bits in the first (primary) index and $k_2$ is the number of bits in the secondary index. Also, let $n_{k1}$ be the number of entries filled in the first index table, which has an index size of $k_1$ bits. Then, Memory taken by the primary index=$2^{k1}*M$ Memory taken by the secondary index=$n_{k1}*2^{k2}*(\log_2 N+1)$ Total Memory taken by the keys by two level indexing=$2^{k1}*M+n_{k1}*2^{k2}*(\log_2 N+1)+(K-k_1-k_2)*N$ This expression needs to be minimized. On solving this equation, by taking partial derivatives, the following are obtained:

$$k1=\log_2(N*\log_2 e/M)$$

$$k2=\log_2(N*\log_2 e/(n_{k1}*(\log_2 N+1)))$$

In general, for multi level indexing for L levels, the index sizes turn out to be $$k1=\log_2(N*\log_2 e/M)$$

$$k2=\log_2(N*\log_2 e/(n_{k1}*M))$$

$$k3=\log_2(N*\log_2 e/(n_{k1+k2}*M))$$

$$ki=\log_2(N*\log_2 e/(n_{k1+k2+\ldots+ki-1}*M))$$

$$kL=\log_2(N*\log_2 e/(n_{k1+k2+\ldots+kL-1}*(\log_2 N+1)))$$

The formulas for computing the savings in memory in percentage and absolute terms can be similarly extended.

The problem can be expressed as "How many levels of indexes should be built and how many bits should be used in each of those indices to minimize the total memory taken by set of key-value pairs"?

The solution above can be described as follows—at each stage, the number of bits remaining in the key is looked at. Then, it is determined what is the maximum number of the bits that can be taken away from the key, given the number of entries present in the latest index table. If an amount of memory taken up by creating a new index (based on occupancy) is less than the amount of memory taken by the bits in the key, a new level of index is introduced. This process is continued until no more bits can be taken away from the key. The formulas described above can be directly used to calculate the index sizes at various levels.

In another embodiment of the present invention, the various index tables themselves can be compacted as key value pairs, the key being the index in the table and the value being the value at that index. For example, at index level i, the size of the key is $k_i$ bits and there are $n_{ki}$ entries in the index table. The values in the index tables are that of pointers of size M bits. It would make sense to convert the index table in a key value pair only if $$(k_i+M)*n_{ki}<M*2^{ki}$$

A "fill factor" $f_{ki}$ may be defined as $f_{ki}=n_{ki}/2^{ki}$. At a conceptual level, this represents the factor of filled entries in the $i^{th}$ index. Therefore, it makes sense to "compact" a table only if the fill factor $$f_{ki}<M/(k_i+M)$$

Since it has already been proven that that at least $\log_2(n_{ki}/M)$ can be saved by indexes, the condition can be modified to "compact" a table only if:

$$f_{ki}<M/(k_i+M-\log_2(n_{ki}/M)).$$

As an extreme optimization, even the index tables can be optimized for memory, by making them key value pairs and then building indexes on that key value pair. This can be recursively performed until the condition above is satisfied.

Even the original optimization problem of N key value pairs of key sizes K bits and value sizes V bits can be looked as a "compaction" of a table with size $2^K$. The recursive formula to express the minimum amount of memory using the algorithm above can be expressed as mem($K, V, N$) = $N*(V+K-\Sigma^{L}_{i=1}ki)+\Sigma^{L}_{i=1}$mem($ki, M, n_{ki}$)→if $F=N/2^{K}<V/(K+V-\log_2(N/M))$ =
$V*2^{K}$→otherwise As an example, assume that the size of the keys and values are 4 bits each and that there 10 key value pairs in sorted order of keys as follows (1, 10), (2, 3), (4, 1), (5, 12), (6, 5), (7, 3), (8, 2) (9,15), (10, 6), (11, 7), As ordinary hash value pairs, assuming a size of 4 bits for the machine, the keys will take 40 bits and the values will take 40 bits. This is depicted in FIG. 5.

Since this memory optimization basically optimizes the memory consumed by the keys, the keys will be the focus of this example. First fill_factor ($n_{ki}$) is calculated. The fill_factor will have 5 entries. Each entry represents the number of distinct values that the distribution of keys has if only those many bits are taken into account. Therefore, for example, fill_factor[2] represents the factor number of distinct values, that the particular key distribution will have if only 2 bits (from the most significant bit, i.e. leftmost) are taken into account. fill_factor[0] is a special case and is set to 1.0.

Then the bit patterns of the keys are examined. The binary representation for the keys is
0001
0010
0100
0101
0110
0111
1000
1001
1010
1011

To calculate fill_factor[1], we the most significant bit of all the keys is selected:
0
0
0
0
0
0
1
1
1
1

There are two distinct values: 0 & 1. So fill_factor[1]=2.
Similarly on taking two bits (MSB) of all the keys
00
00
01
01
01
01
10
10
10
10

It can be seen that there are 3 distinct values in this key distribution. So fill_factor[2]=3.
Using 3 bits
000
001
010
010
011
011
100
100
101
101

There are 6 distinct values, so fill_factor[3]=6.
For 4 bits, there are 10 distinct values in the key distribution, hence fill_factor[4]=10.

Now, that the fill factors have been calculated, the main process may be attempted to see if any memory can be saved.

As per the process, 1 bit is removed from all the keys. Then additional_mem_taken=fill_factor[0]*2^1*M=1*2*4=8 bits reduction_in_mem=N*1=10 bits.

Since the reduction in memory is greater than the additional memory taken, the process tries to see if one more bit can be taken from the keys. Then,
additional_mem_taken=fill_factor[0]*2^2*M=1*4*4=16 bits
reduction_in_mem=N*2=20 bits.

Since the reduction in memory is still greater than the additional memory taken, the process tries to see if one more bit can be taken from the keys. Then,
additional_mem_taken=fill_factor[0]*2^3*M=1*8*4=32 bits
reduction_in_mem=N*3=30 bits.

Now the additional memory required becomes more than the saving itself. Therefore, it doesn't make sense to take any more bits out for this iteration.

Thus, at the end of the first iteration, the process determines that it can create a first level index for the keys, using 2 bits.

Figure 6:
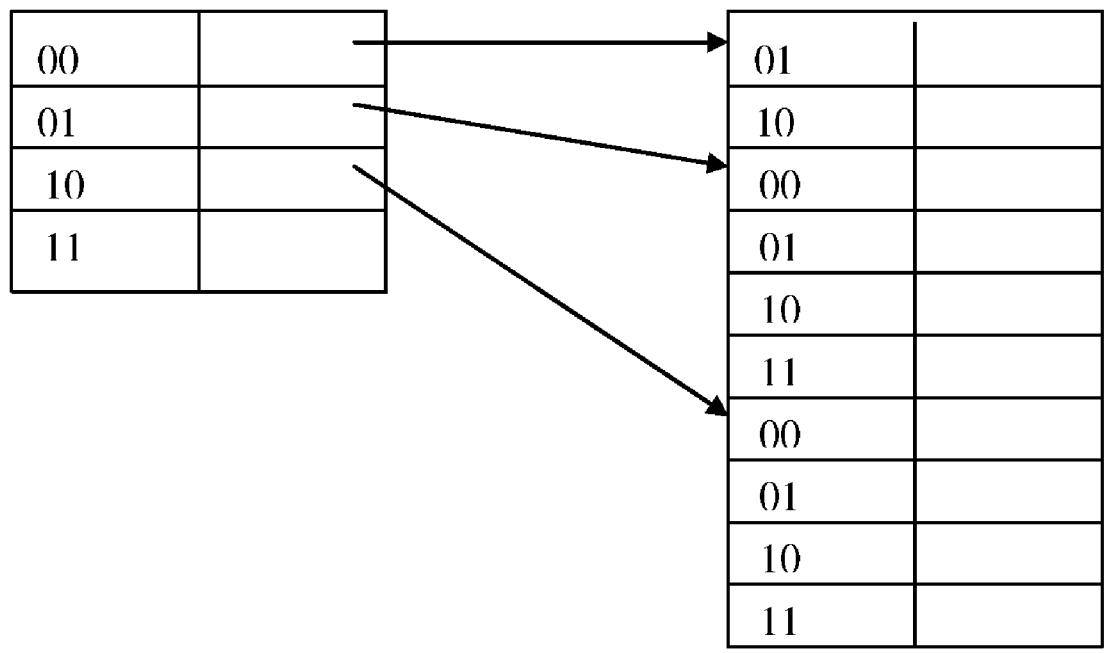
FIG. 6 is a diagram illustrating key data structures during an intermediate step of an embodiment of the present invention.

FIG. 6 depicts an example of what the keys will look like at this stage in the process.

The process then tries to determine if another level of index is possible. For that, it looks at the remaining keys in the main table.

As per the process, at this stage total_bits_removed=2, bits_left_in_key=2.

Again, it tries to see if it is feasible to take out 1 more bit from the remaining keys. additional_mem_taken=fill_factor[2]*2^1*M=3*2*4=24 bits reduction_in_mem=N*1=10 bits.

Clearly, it is not worthwhile to create a second level index for this key distribution. Thus, the process ends.

Figure 7:
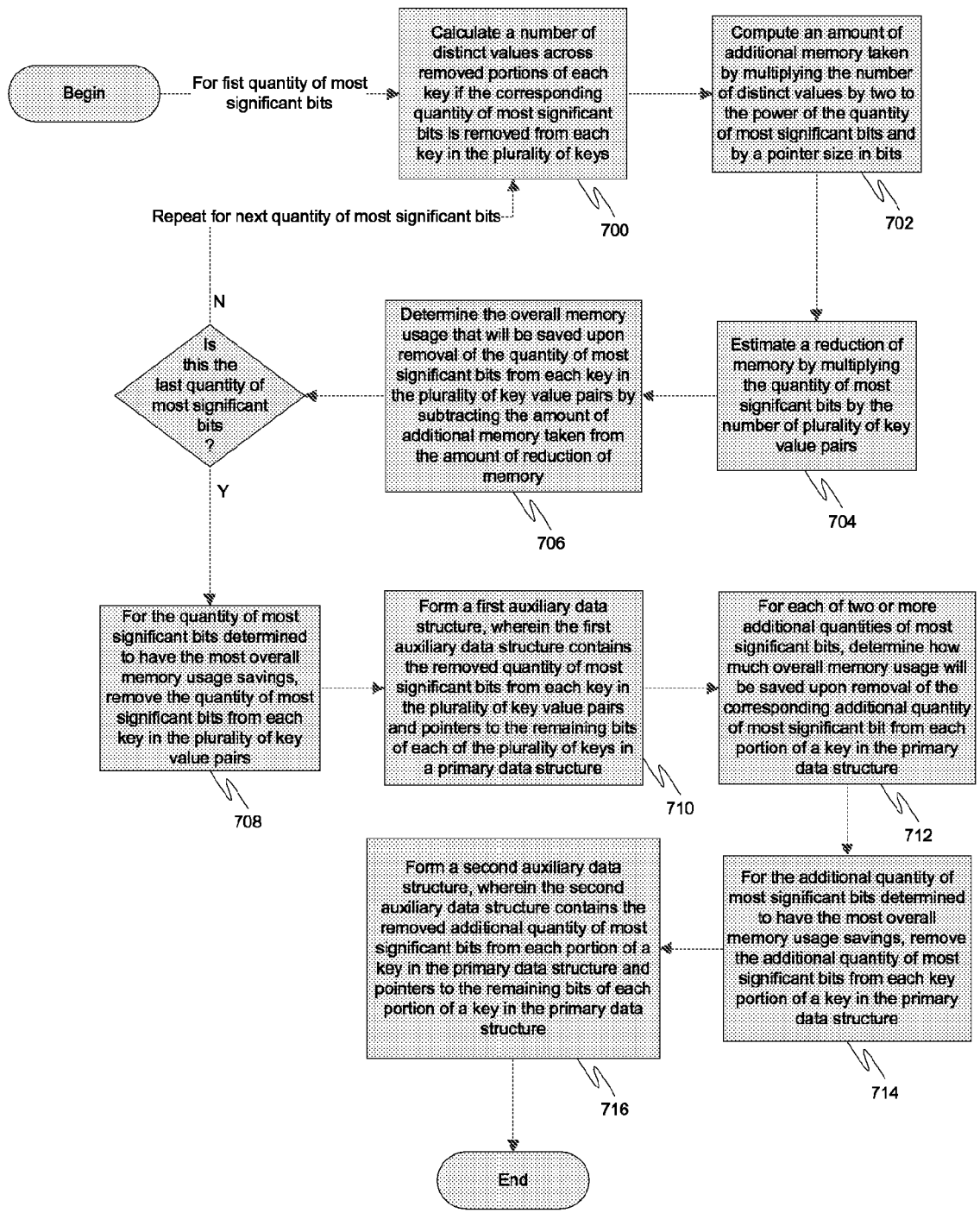
FIG. 7 is a flow diagram illustrating a method for storing a plurality of key value pairs in accordance with an embodiment of the present invention.

FIG. 7 is a flow diagram illustrating a method for storing a plurality of key value pairs in accordance with an embodiment of the present invention. It should be noted that the plurality of key value pairs in this method may not necessarily be all the key value pairs available to be stored. The key value pairs may be stored in a primary data structure prior to the beginning of the method. However, alternative embodiments are possible wherein the key value pairs are not stored until during or after the process has completed. 700-706 may be repeated for each of two or more quantities of most significant bits. In one embodiment, the two or more quantities are each quantity of bits between one and one less than the total size in bits of the keys in the key value pairs. At 700, a number of distinct values across removed portions of each key if the corresponding quantity of most significant bits is removed from each key in the plurality of key value pairs may be calculated. At 702, an amount of additional memory taken may be computed by multiplying the number of distinct values by two to the power of the quantity of most significant bits and by a pointer size of the machine in bits. At 704, an amount of reduction of memory may be estimated by multiplying the quantity of most significant bits by the number of the plurality of key value pairs. At 706, the overall memory usage that will be saved upon removal of the quantity of most significant bits from each key in the plurality of key value pairs may be determined by subtracting the amount of additional memory taken from the amount of reduction of memory.

At 708, for the quantity of most significant bits determined to have the most overall memory usage savings, the quantity of most significant bits is removed from each key in the plurality of key value pairs. At 710, a first auxiliary data structure is formed, wherein the first auxiliary data structure contains the removed quantity of most significant bits from each key in the plurality of key value pairs and pointers to the remaining bits of each of the plurality of keys in a primary data structure.

A similar process may then be run on the primary data structure again to determine if it would be useful to form a second auxiliary data structure. At 712, for each of two or more additional quantities of most significant bits, it may be determined how much overall memory usage will be saved upon removal of the corresponding additional quantity of most significant bits from each portion of a key in the primary data structure. This may involve performing steps similar to that of 700-706 above. At 714, for the additional quantity of most significant bits determined to have the most overall memory usage savings, the quantity of most significant bits may be removed from each portion of a key in the primary data structure. At 716, a second auxiliary data structure may be formed, wherein the second auxiliary data structure contains the removed additional quantity of most significant bits from each portion of a key in the primary data structure and pointers to the remaining bits of each portion of a key in the primary data structure. This process may then be repeated to determine if additional auxiliary data structures would be useful.

Figure 8:
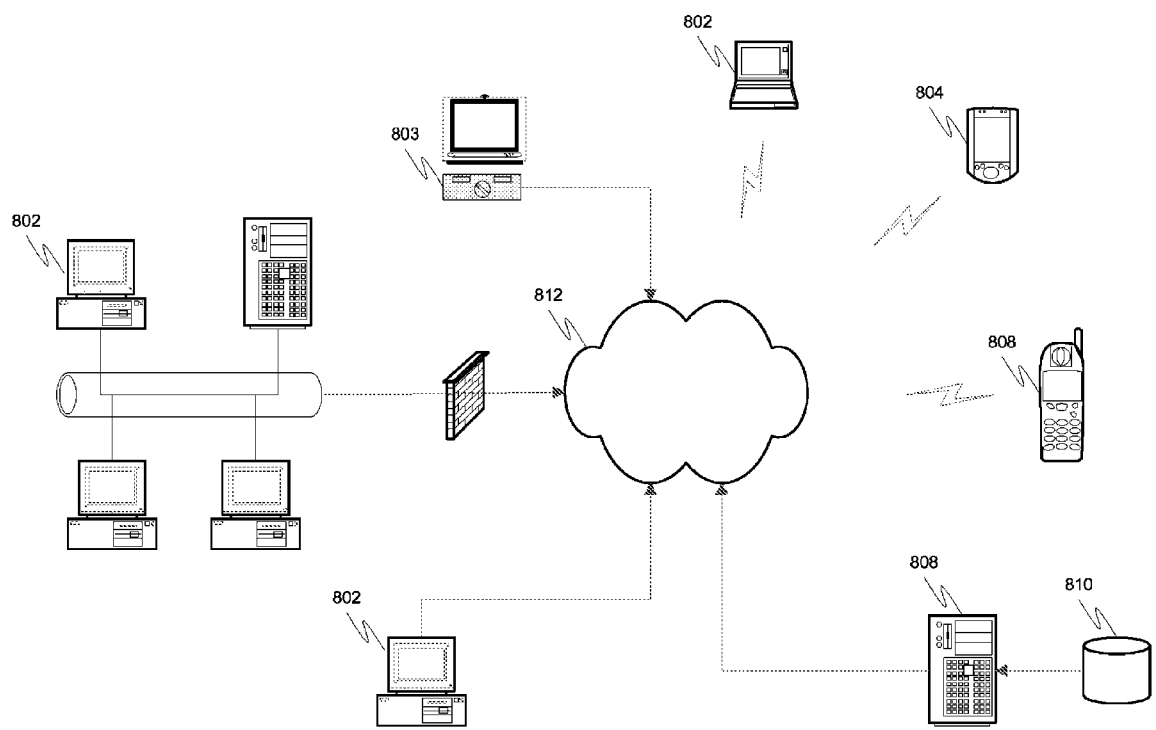
FIG. 8 is an exemplary network diagram illustrating some of the platforms that may be employed with various embodiments of the invention.

It should also be noted that embodiments of the present invention may be implemented on any computing platform and in any network topology in which storage of key value pairs. For example and as illustrated in FIG. 8, implementations are contemplated in which the invention is implemented in a network containing personal computers 802, media computing platforms 803 (e.g., cable and satellite set top boxes with navigation and recording capabilities (e.g., Tivo)), handheld computing devices (e.g., PDAs) 804, cell phones 806, or any other type of portable communication platform. Users of these devices may navigate the network, and information regarding this navigation may be collected by server 808. Server 808 (or any of a variety of computing platforms) may include a memory, a processor, and an interface and may then utilize the various techniques described above. The processor of the server 808 may be configured to run, for example, all of the processes described in FIG. 7. The invention may also be practiced in a wide variety of network environments (represented by network 812), e.g., TCP/IP-based networks, telecommunications networks, wireless networks, etc. The invention may also be tangibly embodied in one or more program storage devices as a series of instructions readable by a computer (i.e., in a computer readable medium).

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for storing a plurality of key value pairs, the method comprising:
   for each of two or more quantities of most significant bits, determining how much overall memory usage will be saved upon removal of the corresponding quantity of most significant bits from each key in the plurality of key value pairs;
   for the quantity of most significant bits determined to have the most overall memory usage savings, removing the quantity of most significant bits from each key in the plurality of key value pairs; and
   forming a first auxiliary data structure, wherein the first auxiliary data structure contains the removed quantity of most significant bits from each key in the plurality of key value pairs and pointers to the remaining bits of each key of the plurality of keys in a primary data structure.

2. The method of claim 1, wherein the determining includes:
   for each of two or more quantities of most significant bits:
      calculating a number of distinct values across removed portions of each key if the corresponding quantity of most significant bits is removed from each key in the plurality of key value pairs;
      computing an amount of additional memory taken by multiplying the number of distinct values by two to the power of the quantity of most significant bits and by a pointer size;
      estimating an amount of reduction of memory by multiplying the quantity of most significant bits by the number of the plurality of key value pairs; and
      determining the overall memory usage that will be saved upon removal of the quantity of most significant bits from each key in the plurality of key value pairs by subtracting the amount of additional memory taken from the amount of reduction of memory.

3. The method of claim 1, wherein the two or more quantities of most significant bits are each quantity of bits between one and one less than the total size in bits of the keys in the key value pairs.

4. The method of claim 1, further comprising:
   for each of two or more additional quantities of most significant bits, determining how much overall memory usage will be saved upon removal of the corresponding additional quantity of most significant bits from each portion of a key in the primary data structure;
   for the additional quantity of most significant bits determined to have the most overall memory usage savings, removing the quantity of most significant bits from each portion of a key in the primary data structure; and
   forming a second auxiliary data structure, wherein the second auxiliary data structure contains the removed additional quantity of most significant bits from each portion of a key in the primary data structure and pointers to the remaining bits of each portion of a key in the primary data structure.

5. The method of claim 1, wherein the plurality of key value pairs are stored in a primary data structure prior to the determining.

6. A server comprising:
   an interface;
   a storage; and
   a processor coupled to the interface and to the storage and configured to store a plurality of key value pairs in the storage by:
      for each of two or more quantities of most significant bits, determining how much overall memory usage will be saved upon removal of the corresponding quantity of most significant bits from each key in the plurality of key value pairs;

for the quantity of most significant bits determined to have the most overall memory usage savings, removing the quantity of most significant bits from each key in the plurality of key value pairs; and forming a first auxiliary data structure, wherein the first auxiliary data structure contains the removed quantity of most significant bits from each key in the plurality of key value pairs and pointers to the remaining bits of each key of the plurality of keys in a primary data structure.

7. The server of claim 6, wherein the determining includes:
for each of two or more quantities of most significant bits:
calculating a number of distinct values across removed portions of each key if the corresponding quantity of most significant bits is removed from each key in the plurality of key value pairs;
computing an amount of additional memory taken by multiplying the number of distinct values by two to the power of the quantity of most significant bits and by a pointer size;
estimating an amount of reduction of memory by multiplying the quantity of most significant bits by the number of the plurality of key value pairs; and
determining the overall memory usage that will be saved upon removal of the quantity of most significant bits from each key in the plurality of key value pairs by subtracting the amount of additional memory taken from the amount of reduction of memory.

8. The server of claim 6, wherein the two or more quantities of most significant bits are each quantity of bits between one and one less than the total size in bits of the keys in the key value pairs.

9. The server of claim 6, wherein the processor is further configured to:
for each of two or more additional quantities of most significant bits, determining how much overall memory usage will be saved upon removal of the corresponding additional quantity of most significant bits from each portion of a key in the primary data structure;
for the additional quantity of most significant bits determined to have the most overall memory usage savings, removing the quantity of most significant bits from each portion of a key in the primary data structure; and
forming a second auxiliary data structure, wherein the second auxiliary data structure contains the removed additional quantity of most significant bits from each portion of a key in the primary data structure and pointers to the remaining bits of each portion of a key in the primary data structure.

10. The server of claim 6, wherein the plurality of key value pairs are stored in a primary data structure prior to the determining.

11. An apparatus for storing a plurality of key value pairs, the apparatus comprising:
means for, for each of two or more quantities of most significant bits, determining how much overall memory usage will be saved upon removal of the corresponding quantity of most significant bits from each key in the plurality of key value pairs;
means for, for the quantity of most significant bits determined to have the most overall memory usage savings, removing the quantity of most significant bits from each key in the plurality of key value pairs; and
means for forming a first auxiliary data structure, wherein the first auxiliary data structure contains the removed quantity of most significant bits from each key in the plurality of key value pairs and pointers to the remaining bits of each key of the plurality of keys in a primary data structure.

12. The apparatus of claim 11, wherein the means for determining includes:
means for, for each of two or more quantities of most significant bits:
calculating a number of distinct values across removed portions of each key if the corresponding quantity of most significant bits is removed from each key in the plurality of key value pairs;
computing an amount of additional memory taken by multiplying the number of distinct values by two to the power of the quantity of most significant bits and by a pointer size;
estimating an amount of reduction of memory by multiplying the quantity of most significant bits by the number of the plurality of key value pairs; and
determining the overall memory usage that will be saved upon removal of the quantity of most significant bits from each key in the plurality of key value pairs by subtracting the amount of additional memory taken from the amount of reduction of memory.

13. The apparatus of claim 11, wherein the two or more quantities of most significant bits are each quantity of bits between one and one less than the total size in bits of the keys in the key value pairs.

14. The apparatus of claim 11, further comprising:
means for, for each of two or more additional quantities of most significant bits, determining how much overall memory usage will be saved upon removal of the corresponding additional quantity of most significant bits from each portion of a key in the primary data structure;
means for, for the additional quantity of most significant bits determined to have the most overall memory usage savings, removing the quantity of most significant bits from each portion of a key in the primary data structure; and
means for forming a second auxiliary data structure, wherein the second auxiliary data structure contains the removed additional quantity of most significant bits from each portion of a key in the primary data structure and pointers to the remaining bits of each portion of a key in the primary data structure.

15. The apparatus of claim 11, wherein the plurality of key value pairs are stored in a primary data structure prior to the determining.

16. A program storage device readable by a machine, tangibly embodying a program of instructions executable by the machine to perform a method for storing a plurality of key value pairs, the method comprising:
for each of two or more quantities of most significant bits, determining how much overall memory usage will be saved upon removal of the corresponding quantity of most significant bits from each key in the plurality of key value pairs;
for the quantity of most significant bits determined to have the most overall memory usage savings, removing the quantity of most significant bits from each key in the plurality of key value pairs; and
forming a first auxiliary data structure, wherein the first auxiliary data structure contains the removed quantity of most significant bits from each key in the plurality of key value pairs and pointers to the remaining bits of each key of the plurality of keys in a primary data structure.

17. The program storage device of claim 16, wherein the determining includes:
for each of two or more quantities of most significant bits:
calculating a number of distinct values across removed portions of each key if the corresponding quantity of most significant bits is removed from each key in the plurality of key value pairs;
computing an amount of additional memory taken by multiplying the number of distinct values by two to the power of the quantity of most significant bits and by a pointer size;
estimating an amount of reduction of memory by multiplying the quantity of most significant bits by the number of the plurality of key value pairs; and
determining the overall memory usage that will be saved upon removal of the quantity of most significant bits from each key in the plurality of key value pairs by subtracting the amount of additional memory taken from the amount of reduction of memory.

18. The program storage device of claim 16, wherein the two or more quantities of most significant bits are each quantity of bits between one and one less than the total size in bits of the keys in the key value pairs.

19. The program storage device of claim 16, wherein the method further comprises:
for each of two or more additional quantities of most significant bits, determining how much overall memory usage will be saved upon removal of the corresponding additional quantity of most significant bits from each portion of a key in the primary data structure;
for the additional quantity of most significant bits determined to have the most overall memory usage savings, removing the quantity of most significant bits from each portion of a key in the primary data structure; and
forming a second auxiliary data structure, wherein the second auxiliary data structure contains the removed additional quantity of most significant bits from each portion of a key in the primary data structure and pointers to the remaining bits of each portion of a key in the primary data structure.

20. The program storage device of claim 16, wherein the plurality of key value pairs are stored in a primary data structure prior to the determining.

\* \* \* \* \*